(12) United States Patent
Cheong et al.

(10) Patent No.: US 12,586,857 B2
(45) Date of Patent: Mar. 24, 2026

(54) BATTERY MODULE

(71) Applicants: SK INNOVATION CO., LTD., Seoul (KR); SK On Co., Ltd., Seoul (KR)

(72) Inventors: Hoemin Cheong, Daejeon (KR); HyunJoon Park, Daejeon (KR); Majid Abbasi Gharacheh, Daejeon (KR); Wook Hyun Kim, Daejeon (KR); Tae Hyun Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 806 days.

(21) Appl. No.: 17/983,834

(22) Filed: Nov. 9, 2022

(65) Prior Publication Data

US 2023/0146342 A1 May 11, 2023

(30) Foreign Application Priority Data

Nov. 9, 2021 (KR) ........................ 10-2021-0153119

(51) Int. Cl.
H01M 50/258 (2021.01)
H01M 50/224 (2021.01)

(52) U.S. Cl.
CPC ....... H01M 50/258 (2021.01); H01M 50/224 (2021.01)

(58) Field of Classification Search
CPC ............. H01M 50/258; H01M 50/224; H01M 50/207; H01M 50/204; H01M 50/244; Y02E 60/10; B23K 26/0006; B23K 26/242; B23K 26/26; B23K 26/32; B23K 26/354; B23K 2101/12; B23K 2101/36; B23K 2103/10; B23K 37/00; B23K 26/24; C22C 21/02
See application file for complete search history.

(56) References Cited

U.S. PATENT DOCUMENTS

2020/0094351 A1 3/2020 Tao

FOREIGN PATENT DOCUMENTS

| | | | |
|---|---|---|---|
| JP | 2018-174059 A | 11/2018 |
| KR | 10-2015-0123103 A | 11/2015 |
| KR | 10-1634167 B1 | 6/2016 |
| KR | 10-2018-0043291 A | 4/2018 |
| KR | 10-2020-0009371 A | 1/2020 |

OTHER PUBLICATIONS

Kumar et al., Laser wobble welding of fluid-based cooling channel joining for battery thermal management 2021, Journal of Manufacturing Processes, 67, 151-169.*

(Continued)

*Primary Examiner* — Kiran Quraishi Akhtar
(74) *Attorney, Agent, or Firm* — IP & T GROUP LLP

(57) ABSTRACT

Provided is a battery module including a housing having an internal accommodating space and a plurality of battery cells located in the internal accommodating space, wherein the housing includes a welding joint portion in which a first base material of a first alloy and a second base material of a second alloy are welded, the welding joint portion includes a bonding region in which the first base material and the second base material are melt-bonded and a surface region covering the bonding region, and the bonding region and the surface region have different microstructures.

14 Claims, 9 Drawing Sheets

(56)     References Cited

OTHER PUBLICATIONS

Office Action for Korean Patent Application No. 10-2021-0153119 issued by the Korean Patent Office on Sep. 16, 2025.

Nikhil Kumer et al., Laser wobble welding of fluid-based cooling channel joining for battery thermal management, Journal of Manufacturing Processes, 2021, pp. 151-169, vol. 67, Elsevier.

Shaoning Geng et al., Identification of nucleation mechanism in laser welds of aluminum alloy, Applied Physics A, 2019, pp. 1-7, vol. 125, Article 396, Springer.

Genyu Chen et al., Research on the " ∞ "-shaped laser scanning welding process for aluminum alloy, Optics and Laser Technology, 2019, pp. 32-41, vol. 115, Elsevier.

Extended European Search Report for the European Patent Application No. 22205877.8 issued by the European Patent Office on Apr. 20, 2023.

* cited by examiner

BATTERY MODULE

CROSS-REFERENCE TO RELATED APPLICATIONS

This application claims priority under 35 U.S.C. § 119 to Korean Patent Application No. 10-2021-0153119, filed on Nov. 9, 2021, in the Korean Intellectual Property Office, the disclosure of which is incorporated herein by reference in its entirety.

TECHNICAL FIELD

The following disclosure relates to a battery module, and in particular, to a battery module including a housing having an internal accommodating space and a plurality of battery cells located in the internal accommodating space.

BACKGROUND

A module housing has a structure in which housing members that may be assembled and joined to form a sealed internal accommodating space are joined each other by welding, and pouch-type or prismatic battery cells connected in series/parallel to each other are located in the internal accommodating space.

However, when an external shock is applied to the housing, a connection portion (welded portion) between the housing members does not have high resistance to external shock, so the connection portion may be easily damaged or sealing properties may be lowered, and there is a risk of leakage of harmful substances that occur in a battery cell, and in addition, there is a risk of fatigue damage due to repeated loads caused by charging and discharging or vibration.

Surface defects, such as holes, craters, and burrs formed during a welding process may be main factors that reduce mechanical properties of the welded portion.

In a related art, in order to suppress adverse effects caused by such surface defects, surface defects may be removed by physically working welded portions or surface defects below a certain level may be allowed and a degree of defects is managed.

RELATED ART DOCUMENT

Patent Document (Patent document 1) Korean Patent Laid-open Publication No. 2015-0123103

SUMMARY

An exemplary embodiment of the present invention is directed to providing a battery module having an improved mechanical properties and a manufacturing method thereof.

In one general aspect, a battery module includes: a housing having an internal accommodating space; and a plurality of battery cells located in the internal accommodating space, wherein the housing includes a welding joint portion in which a first base material of a first alloy and a second base material of a second alloy are welded, the welding joint portion includes a bonding region in which the first base material and the second base material are melt-bonded and a surface region covering the bonding region, and the bonding region and the surface region have different microstructures.

The bonding region and the surface region may have different microstructures due to different thermal histories.

The surface region may have a finer microstructure compared to the bonding region.

The surface region may have a smaller average grain size or lamellar spacing compared to the bonding region.

The bonding region and the surface region may have different distributions of impurities due to a difference in the microstructure of a metal.

Based on a minimum cross-section traversing the welding joint portion from the first base material side to the second base material side, as a reference plane, a boundary line between the bonding region and the surface region in the reference plane may include a convex region convex to the outside of the housing.

The surface region may have a single-layer structure or a multi-layer structure in which two or more layers are stacked.

When a penetration depth of the welding joint portion is D, a thickness of the surface region may be in the range of 0.05 D to 0.30 D.

The microstructure may be a lamellar structure.

When a lamellar spacing of the bonding region is tw, a lamellar spacing ts of the surface region may be in the range of 0.05 tw to 0.70 tw.

The first alloy and the second alloy may each be an aluminum alloy.

At least one of the first alloy and the second alloy may be an aluminum-based alloy including silicon.

The welding joint portion may be a butt joint, a corner joint, an edge joint, or a T joint (tee joint).

The first base material and the second base material may each have a shape of a quadrangular plate or a bent quadrangular plate in which one or both end portions are vertically bent.

The housing may include: a bent quadrangular plate-shaped first housing member including a bottom surface and two left and right side surfaces integrally connected to the bottom surface; a quadrangular plate-shaped second housing member coupled to the first housing member to form an upper surface facing the bottom surface; and quadrangular plate-shaped third housing member and fourth housing member coupled to the first housing member and the second housing member to form two front and rear side surfaces, wherein the first base materials connected to each other by the welding joint portion is one of the first to fourth housing members, and the second base material is different from the first base material and is another member of the first to fourth housing members.

Other features and aspects will be apparent from the following detailed description, the drawings, and the claims.

DETAILED DESCRIPTION OF EXEMPLARY EMBODIMENTS

Figure 1:
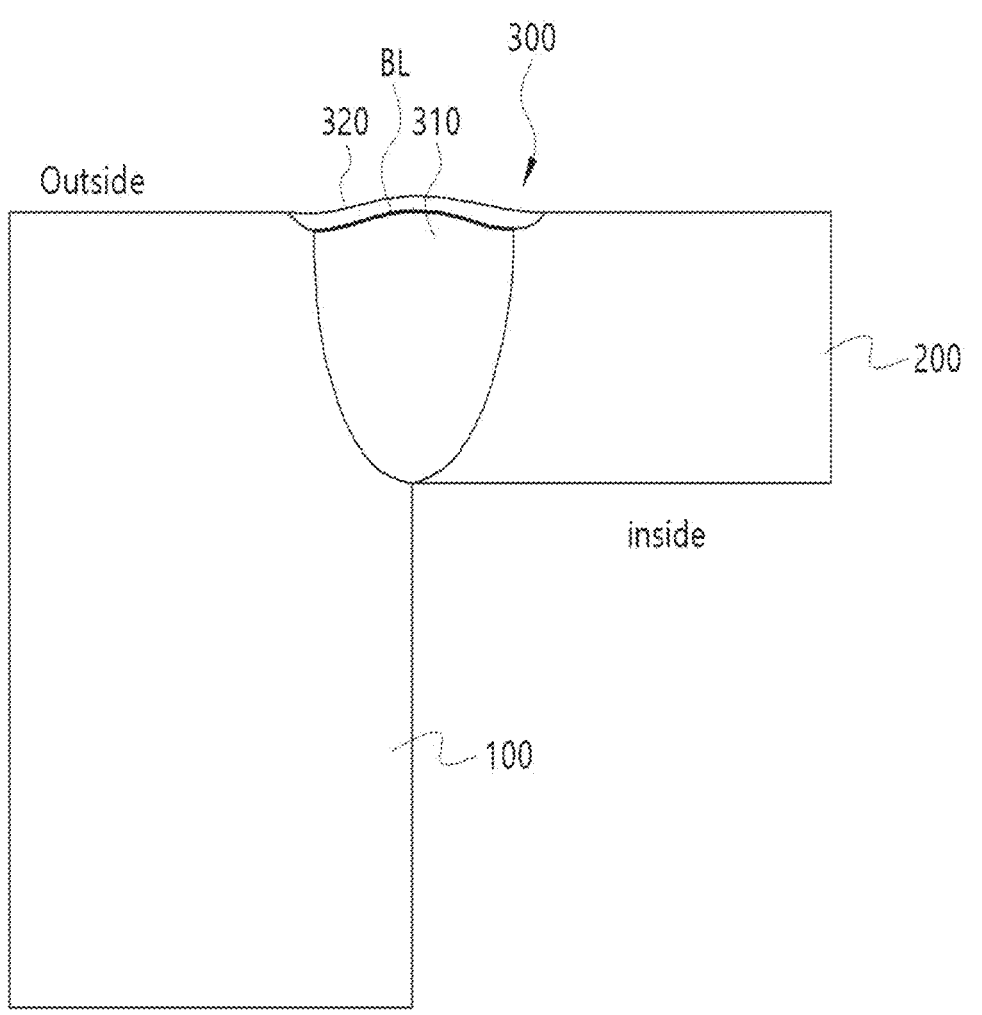
FIG. 1 is a cross-sectional view illustrating a cross-section of a welding joint portion in a battery module according to an exemplary embodiment of the present invention.

Hereinafter, a battery module and a method of manufacturing the same according to the present invention will be described in detail with reference to the accompanying drawings. The drawings presented hereinafter are provided as examples to sufficiently transmit the technical concept of the present invention. Thus, the present invention is not limited to the drawings presented hereinafter and may be embodied in a different form, and the drawings present hereinafter may be exaggerated to be illustrated to clarify the technical concept of the present invention. Here, technical terms and scientific terms have the same meaning as generally understood by a person skilled in the art to which the present invention pertains, unless otherwise defined, and a detailed description for a related known function or configuration considered to unnecessarily divert the gist of the present invention will be omitted in the following descriptions and accompanying drawings.

Also, as used herein, the singular forms used in the specification and claims are intended to include the plural forms as well, unless the context clearly indicates otherwise.

In the specification and enclosed claims, terms, such as first, second, etc. are used for the purpose of distinguishing one component from another, not in a limiting sense.

In addition, terms, such as "including" or "having" means that the features or components described in the specification are present, and do not preclude the possibility that one or more other features or components will be added.

In this specification and the appended claims, a case in which a portion of a film (layer), region, component, etc. is mentioned to be on or on another portion includes not only a case in which the portion is directly on top of another portion in contact therewith but also a case in which another film (layer), other regions, and other components are interposed therebetween.

In the following description, first base material and second base material may be members belonging to a housing and may be members coupled to each other by welding to form at least a portion of the housing. In addition, a surface in an internal accommodating space of the housing (members forming the housing) may be an inner surface, a direction (the shortest direction) from a point of the housing outside the housing to the internal accommodating space may refer to an inward direction (or an inner side), a surface opposing an inner surface or forming an outer casing may be referred to as an outer surface or a surface, and a direction (the shortest direction) from one point of the housing in the internal accommodating space to the outside of the housing may refer to an outward direction (or an outer side).

As results of conducting an in-depth study including welding conditions and post-welding post-treatment to suppress defects occurring during housing welding in a battery module, the present applicant discovered that, after performing basic welding for melting and binding between housing members, when only the vicinity of a surface was selectively re-melted or re-solidified by applying energy to a surface side of a welded portion in which welding defects occur, the defects were resolved and, at the same time, a microstructure of the vicinity of the re-melted and re-solidified surface was changed to be different from the inside, and the welded portion was protected from adverse effects from impurities, as well as surface defects, thereby completing the disclosure.

A battery module according to the present invention based on the above discovery includes: a housing having an internal accommodating space; and a plurality of battery cells located in the internal accommodating space, wherein the housing includes a welding joint portion in which a first base material of a first alloy and a second base material of a second alloy are welded, and the welding joint portion includes a bonding region in which the first base material and the second base material are melt-bonded and a surface region covering the bonding region, wherein the bonding region and the surface region have different microstructures. That is, the welding joint portion may include the bonding region and the surface region having different microstructures, the bonding region may be located on the internal accommodating space side and the surface region may be located on the outside of the housing, and the surface region may cover the bonding region so that the surface of the welding joint portion may be formed by the surface region.

In the battery module according to the present invention, the housing may have a different microstructure from that of the bonding region and may have improved mechanical properties by the surface region covering the bonding region.

Specifically, the bonding region and the surface region may have different microstructures from each other due to different thermal histories. The different thermal histories may refer to the histories of melting and solidification of a metal that belongs to the welding joint portion.

Based on the melting of a metal and solidification of the molten melt as a unit cycle, Cs, which is the number of unit cycles in the thermal history of the surface region, may be greater than Cj, which is the number of unit cycles in the thermal history of the bonding region. Specifically, Cs may be Cj+1 to Cj+5, Cj+1 to Cj+3, or Cj+1.

In addition, in terms of a time scale, based on an earlier time point, among time points at which a first unit cycle takes place in Cs or Cj, at least the last unit cycle (Cs-th unit cycle) in the surface region may be located after the last unit cycle (Cj-th unit cycle) in the bonding region. In addition, based on the time scale, unit cycles performed first to Cj-th times in the surface region may be performed at substantially the same or different time points from that of unit cycles performed first to Cj-th times in the bonding region, respectively. In this case, performing the unit cycle at substantially the same time in the surface region and the bonding region may mean that metals belonging to the surface region and the bonding region are substantially simultaneously melted and solidified.

In the surface region, melting and solidification may occur at least once or more at a time point at which the thermal history of the bonding region is no longer changed due to the difference in the thermal history described above.

As the surface region is a surface layer of the welding joint portion covering the bonding region and has the aforementioned thermal history, solidification may be achieved at a very faster cooling rate in the at least Cs-th (last) unit cycle of the surface region than in the Cj-th (last) unit cycle of the bonding region.

Due to the aforementioned difference in the thermal history, surface defects, such as holes, craters, and burrs formed in the welding joint portion during a welding process may be melted and resolved by the at least last unit cycle in the thermal history of the surface region.

Also, as the surface region corresponds to a thin surface layer in the welding joint portion, the surface region may be melted by applying a significantly lower energy than that of the bonding region at least in the last unit cycle in the thermal history of the surface region. Accordingly, the risk of the occurrence of surface defects, such as holes, craters, and burrs in the surface region may be remarkably reduced, so that the welding joint portion may have a surface substantially free from surface defects. The surface of the welding joint portion free from such surface defects advantageously improves an aesthetic finish of the housing, as well as mechanical properties.

In addition, since the surface region corresponds to a thin surface layer in the welding joint portion, it may be solidified very quickly at least in the last unit cycle in the thermal history of the surface region. By such rapid solidification, solid phase nucleation may be promoted and the growth of the generated nuclei is limited, so that the surface region may have a finer microstructure than the bonding region.

The bonding region and the surface region may have different distributions of impurities due to a difference in metal microstructure, and the surface region having a finer microstructure compared to the bonding region may advantageously reduce impurity-induced defects (or impurity-induced deterioration of physical properties), such as hydrogen embrittlement or hot cracking, caused by impurities.

In detail, unavoidable impurities exist together with the constituent components of the alloy (the first alloy and the second alloy) in the melt melted during welding. When the melt is solidified, grain boundary segregation occurs in which unavoidable impurities gather at grain boundaries. With respect to the same amount of impurities, as the metal structure becomes finer, the ratio (grain boundary area per unit volume) occupied by the grain boundaries may increase, so that a segregation concentration of impurities at the grain boundaries may be lowered. In addition, a certain time is required for the impurities to diffuse into the grain boundary. However, the microstructure by rapid cooling does not overcome an activation energy barrier required for the diffusion of impurities within a short time, and thus, impurities remain in the grains. Therefore, the microstructure by rapid cooling may suppress diffusion of impurities itself, so that the grain boundary segregation concentration of the impurities may be lowered.

Impurities segregated at the grain boundaries may be a major cause of impurity-induced defects, and as described above, since the surface region has a lower impurity grain boundary segregation concentration than that of the bonding region, crack occurrence and propagation at the welding joint portion may be suppressed to have improved mechanical properties.

As described above, the surface region of the welding joint portion may have a finer microstructure than that of the bonding region. In this case, the fineness of the microstructure may be determined by an average grain size or lamellar spacing in each region.

In detail, the fine level of the structure may be determined by considering a matrix (continuum) without considering a dispersion in the microstructure.

More specifically, when the matrix is single-phase in the structure of the welding joint portion (surface region and bonding region), an average grain size (diameter or radius) of each region may be a measure of fineness. Meanwhile, when the matrix of the welding joint portion (surface region and bonding region) is formed by two or more different phases, a distance between phases or a size or thickness of one phase may be a measure of fineness. A representative example of two or more phases forming a matrix may include a lamellar structure, and in this case, a lamellar spacing may be a measure of fineness.

As is known, the lamellar structure is a structure in which two different phases are stacked in a layer shape, and when two different phases are a phase and S phase, the $\alpha$ phase and $\beta$ phase in a layer shape may be alternately stacked generally. The lamellar spacing may refer to a distance from a center of one layer ($\alpha 1$ phase layer), among two same phase layers, to a center of the same phase layer ($\alpha 2$ phase layer) adjacent thereto, based on the same phase (for example, $\alpha 1$ phase-$\beta$(phase-$\alpha 2$ phase) located adjacent to each other in the lamellar structure of $\alpha$ phase-$\beta$ phase-$\alpha$ phase-$\beta$ phase . . . .

Experimentally, an average grain size of each region may be an average diameter (or radius) calculated by measuring sizes of randomly 50 or more grains, specifically, 100 or more grains, and more specifically, 300 or more grans by at least regions, for which one grain is defined by a grain boundary forming a closed curve (minimum closed curve) in each of the bonding region and the surface region in a reference plane that is a minimum cross-section traversing the welding joint portion from the first base material side to the second base material side and a diameter (or radius) of a circle converted into a circle having the same area by image processing is determined as a diameter (or radius) of the grain.

Experimentally, for an average lamellar spacing of each region, one of two phases constituting the lamella may be selected as a reference phase on a reference plane that is equally defined and a distance from a center of a layer on one reference to a center of another layer on one reference adjacent thereto may be measured to be determined as a lamellar distance, and an average value calculated by measuring randomly 50 or more lamellar distances, specifically, 100 or more lamellar distances, more specifically, 200 or more lamellar distances, by at least regions, may be determined as an average lamellar distance.

Experimentally, the average grain size or the lamellar spacing may be measured through a scanning electron microscope observation photograph of a cross-section (minimum cross-section) of the welding joint portion, a transmission electron microscope observation photograph, or grain orientation observation photograph based on electron backscattered diffraction pattern analysis.

Accordingly, the fact that the surface region has a fine microstructure compared to the bonding region may mean that the average grain size (diameter or radius) of the surface region or the average lamella spacing is smaller than that of the bonding region.

In an exemplary embodiment, when the welding joint portion has a single-phase matrix structure and the average grain radius of the bonding region is Gw, the average grain radius Gs of the surface region may be 0.1 Gw to 0.9 Gw, specifically 0.2 Gw to 0.7 Gw, and more specifically 0.2 Gw to 0.5 Gw.

In an exemplary embodiment, when the welding joint portion has a lamellar matrix structure or the microstructure of the welding joint portion has a lamellar structure and the lamellar spacing of the bonding region is tw, the lamellar spacing ts of the surface region may be 0.05 tw or more, 0.10 tw or more, 0.70 tw or less, 0.50 tw or less, 0.40 tw or less, or a value between the above values, specifically 0.05 tw to 0.70 tw, more specifically 0.10 tw to 0.50 tw, and even more specifically 0.10 tw to 0.40 tw.

The housing may be formed of an aluminum-based material. That is, each of the first base material and the second base material may be an aluminum-based alloy. That is, the first alloy of the first base material and the second alloy of the second base material may be aluminum-based alloys independently of each other, and the first alloy and the second alloy may be a solid solution hardening type aluminum alloy or a precipitation hardening type aluminum alloy, independently of each other. Examples of the aluminum alloy suitable for the housing may include an Al—Mg-based aluminum alloy, an Al—Mg—Si-based aluminum alloy, an Al—Si-based aluminum alloy, or an Al—Si—Cu-based aluminum alloy. Examples of an aluminum alloy suitable for a practical housing may include an A15000 series aluminum alloy, an A16000 series aluminum alloy, an aluminum alloy for die casting (ALDC), such as ALDC 1, 3, 12, etc., but the aluminum alloy is not necessarily limited to these materials.

In an advantageous example, the welding joint portion may have a lamellar structure. When the surface region has the same thermal history, greater refinement (larger grain boundary area per unit volume) may be achieved in the lamellar structure than in the microstructure of a general single-phase matrix, thereby advantageously suppressing impurity-induced defects (or impurity-induced deterioration of physical properties).

Accordingly, in an advantageous example, at least one of the first alloy and the second alloy may be an aluminum-based alloy (lamellar-forming aluminum-based alloy) known to form a lamellar structure. In a specific example, the lamellar-forming aluminum-based alloy may be an alloy including element(s) having a eutectic point or a eutectoid point in a phase diagram between one alloying element and aluminum constituting the alloy or a phase diagram between two or more intermetallic compounds constituting an alloy, excluding aluminum, and aluminum. As a specific example, the lamellar-forming aluminum-based alloy may be an aluminum-based alloy including silicon. As a substantial example, at least one of the first alloy and the second alloy, or each of the two alloys, may be an aluminum alloy including 1.6 wt % or more of Si, 2 wt % or more of Si, 5 wt % or more of Si, 9 wt % or more of Si, or 10 wt % or more of Si. In this case, a maximum value of the Si content in the aluminum alloy may vary in consideration of the physical properties required for the housing, but may be substantially 12 to 14 wt %.

FIG. 1 is a cross-sectional view illustrating a cross-section (a reference plane, which is the minimum cross-section as described above) of a welding joint portion in a battery module according to an exemplary embodiment of the present invention, and an inner side is indicated as inside and an outer side is indicated as outside. As in an example illustrated in FIG. 1, a first base material 100 and a second base material 200 belonging to the housing member forming an internal accommodating space in which a plurality of battery cells may be accommodated are welded to each other by a welding joint portion 300. In this case, a reference plane may also be defined as a cross-section of the welding joint portion perpendicular to a welding progress direction.

The welding joint portion 300 may include a bonding region 310 melt-bonded between the first base material 100 and the second base material 200 and a surface region 320 covering the bonding region 310 and forming a surface of the welding joint portion 300.

The surface region 320 may cover substantially the entire bonding region 310 so that the bonding region 310 may not be directly exposed to the surface (may not form the surface of the welding joint portion). At this time, substantially covering the entire bonding region 310 by the surface region 320 means that the surface of the bonding region 310 is not intentionally exposed, but does not exclude a case in which a portion of the bonding region is undesirably exposed to the surface due to unavoidable process deviations. Accordingly, substantially covering the entire bonding region 310 by the surface region 320 means that the ratio of a surface area occupied by the bonding region 310 to the surface of the welding joint portion 300 (the area of the surface occupied by the bonding region/total surface area of the welding joint portion) is within 5%, specifically within 3%, more specifically within 1%, and substantially 0%.

As shown in FIG. 1, the surface region and the bonding region may have a boundary therebetween due to a difference between the microstructures thereof, and this boundary (a boundary line in the cross-section, BL in FIG. 1) may be experimentally observed even in cross-sectional observation with an optical microscope.

In an exemplary embodiment, the boundary line BL between the bonding region 310 and the surface region 320 may include a convex region that is convex to the outside of the housing 1000. This may be a configuration that may be implemented by methodic characteristics that all energy application (for example, laser irradiation) for forming the welding joint portion 300 is performed in one direction of the outside of the housing, and in a welding bead that is a metal in which the first base material 100 and the second base material 200 formed by the application of energy are melted and solidified, the entire region of the bead is not melted again but the vicinity of the surface (including the surface) of the bead is selectively re-melted and solidified to be converted into the surface region 320 and the region that is not re-melted and solidified remains as the bonding region 310. Assuming that a total length of the boundary line between the bonding region 310 and the surface region 320 is 1, a length of the convex region may be 0.1 or more, 0.2 or more, 0.3 or more, 0.7 or less, 0.6 or less, 0.5 or less, or a value between these values, and may be specifically 0.1 to 0.7, more specifically 0.2 to 0.6, and even more specifically 0.3 to 0.5.

Figure 2:
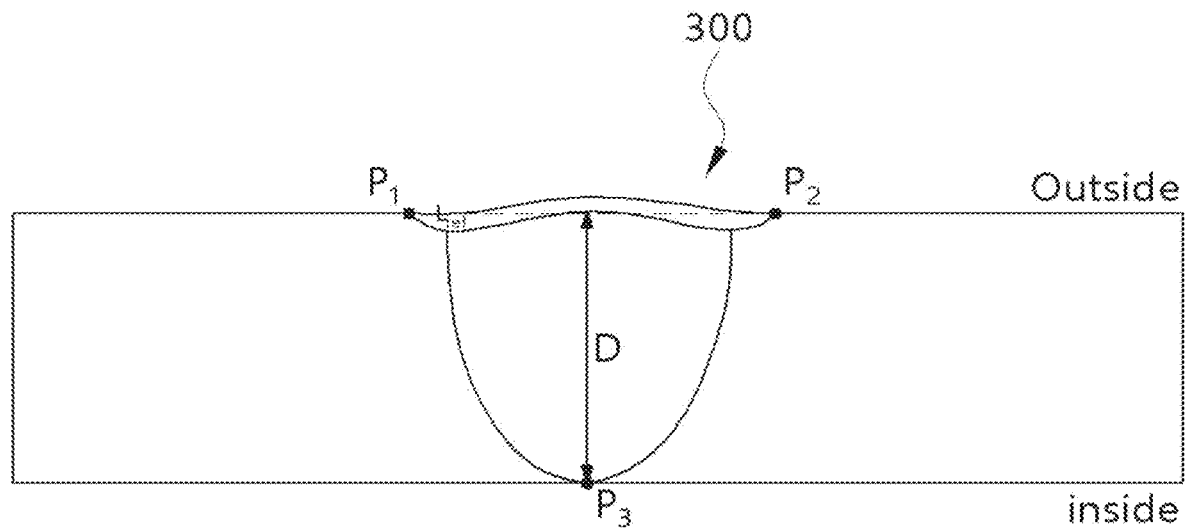
FIG. 2 is another cross-sectional view showing a cross-section of a welding joint portion in the battery module according to an exemplary embodiment of the present invention.

FIG. 2 is a cross-sectional view showing a reference plane, which is a minimum cross-section of the welding joint portion 300 from the first base material 100 side to the second base material 200 side. As in the example shown in FIG. 2, based on a reference line Lref (indicated by the dotted line in FIG. 2) that is a straight line connecting a contact point p1 between the first base material 100 and the welding joint portion 300 and a contact point p2 between the second base material 200 and the welding joint portion 300, a penetration depth D of the welding joint portion 300 may be a length of a perpendicular between the lowest point p3 of the welding joint portion 300 and the reference line Lref (a distance between the lowest point and the foot of perpendicular, indicated by the arrow in FIG. 2). Also, since the surface region 320 covers the entire bonding region 310, the contact points p1 and p2 may correspond to a contact point between the first base material 100 and the second base material 200 and the surface layer 320.

When the penetration depth in the welding joint portion 300 is D, a thickness Ts of the surface region 320 may be 0.05 D to 0.30 D. As described above, in the manufacturing method, the surface region 320 may be formed by re-melting and solidifying the vicinity of the surface of the welding bead. Therefore, it is preferable to re-melt to a depth enough to safely cure (melt) surface defects that occur in the process for melting bonding of the two base materials. However, as a depth of re-melting increases, stronger (higher) energy should be irradiated, and as the amount of irradiated energy increases, the risk of surface defects formed again during re-melting and solidification also increases. The thickness Ts of the surface region satisfying 0.05 D or more, 0.10 D or more, 0.30 D or less, 0.25 D or less, or a value between the above values, specifically 0.05 D to 0.30 D, more specifically 0.05 D to 0.25 D, even more specifically 0.10 D to 0.25 D may be a thickness for suppressing the occurrence of new surface defects in the surface region 320 by low energy while stably curing surface defects existing in the welding bead. At this time, the thickness of the surface region 320 may refer to a thickness of the surface region 320 at a position (point) corresponding to the center of the reference line Lref using the reference line Lref described above based on FIG. 2.

Figure 3A:
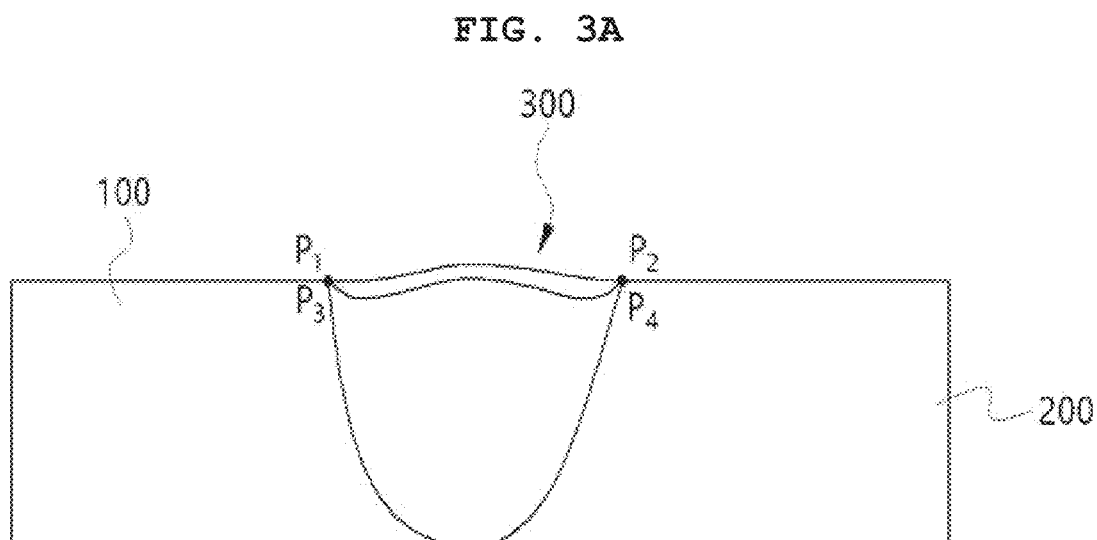
FIG. 3A is a view illustrating a case in which a contact point p1 between a first base material and a surface region and a contact point p2 between a second base material and a surface region substantially overlap both end points p3 and p4 of a boundary line between a surface region and a bonding region in a battery module according to an exemplary embodiment of the present invention.
Figure 3B:
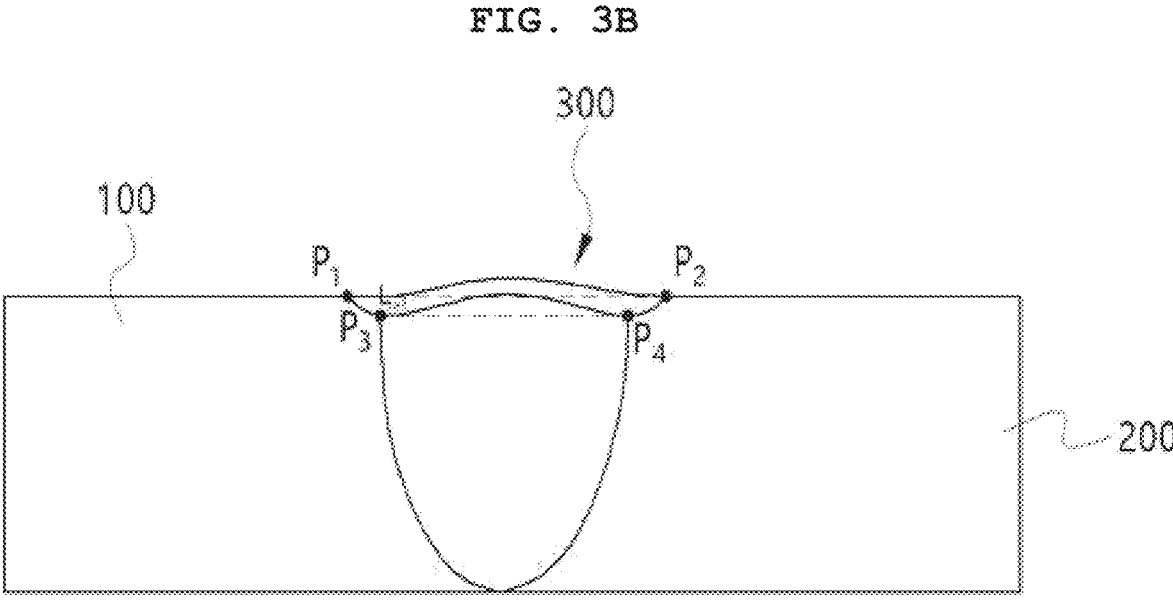
FIG. 3B is a view illustrating a case in which contact points p1 and p2 do not overlap end points p3 and p4 and the end points p3 and p4 are located on an inner side of a reference line Lref as a straight line connecting two contact points in a battery module according to an exemplary embodiment of the present invention.

FIGS. 3A and 3B are cross-sectional views illustrating a reference plane that is a minimum cross-section of the welding joint portion 300 from the first base material 100 side to the second base material 200 side, showing an example in which the surface region 320 covers the entire bonding region 310. Specifically, FIG. 3A shows a case in which a contact point p1 between the first base material 100 and the surface region 320 and a contact point p2 between the second base material 200 and the surface region 320 substantially overlap both end points p3 and p4 of a boundary line between the surface region 320 and the bonding region 310. FIG. 3B illustrates a case in which the contact points p1 and p2 do not overlap the end points p3 and p4 and the end points p3 and p4 are located on an inner side of the reference line Lref that is a straight line connecting the two contact points. As a specific example, a length of the straight line connecting the two end points p3 and p4 may be 50% or more to less than 100% of the length of the reference line Lref, and more specifically, 60% to 95% of the length of the reference line Lref.

In addition, the welding joint portion 300 may have a surface which is smooth and suppressed in irregularities by the surface region 320, so that not only mechanical properties of the housing but also an aesthetic finish may be improved.

In an exemplary embodiment, the surface region 320 may have a single-layer structure or a multi-layer structure in which two or more layers are stacked. In a manufacturing method, when energy is applied with a predetermined time difference to form the surface region 320, the depth of re-melting becomes shallower when the applied energy is reduced. As the applied energy is reduced and the re-melting depth becomes shallower, the cooling may be performed more quickly and the structure may become even finer. Accordingly, the multi-layer structure may be a structure in which two or more layers are stacked, and the stacked layer closer to the surface may have a finer structure than a layer located adjacent to a lower portion thereof. When the surface region 320 has a multi-layer structure, the surface region may have a structure in which 2 to 10, specifically 2 to 5, and more specifically 2 to 3 layers are stacked. A boundary may be observed between two or more layers constituting the surface layer due to a difference in the microstructure for each layer described above, and the structure of the surface layer and the number of stacked layers may be easily observed experimentally by the boundary.

A specific shape of the first base material and the second base material may be a shape in which all or part of the designed shape may be implemented by assembling the housing member(s), which are the first base material and the second base material, depending on an intended designed shape of the housing.

For example, each of the first base material and the second base material may have a shape of a quadrangular plate or a bent quadrangular plate in which one end portion or both end portions are vertically bent, and a designed housing shape may be implemented by assembling one or more quadrangular plates and/or one or more bent quadrangular plates.

As a substantial example, the housing may have a rectangular parallelepiped shape, and based on one axial direction forward/backward, the other axial direction left/right, and the other axial direction up/down in three axes orthogonal to each other, two bent quadrangular plates with both end portions bent are assembled so that the bent end portions are coupled to demarcate a space with up/down and left/right closed and each of the two quadrangular plates is assembled to close an opening of the two bent quadrangular assembled plates to form a closed internal accommodating space with front/rear closed.

As another practical example, the housing may have a rectangular parallelepiped shape, and based on one axial direction forward/backward, the other axial direction left/right, and the other axial direction up/down in three axes orthogonal to each other, a quadrangular plate is vertically coupled to be assembled to two end portions that are not bent of one bent quadrangular plate with both end portions bent to demarcate a space with front/rear and left/right closed and one quadrangular plate is assembled to close upper or lower opening to form a closed internal accommodating space.

At this time, assembly by coupling the housing members (quadrangular plate, bent quadrangular plate) may mean binding the housing members by welding. When the housing has one or more welding portions (welding lines), at least one welding portion may have a shape of the welding joint portion described above, and in addition, all the welding portions may have the shape of the welding joint portion described above.

Figure 4:
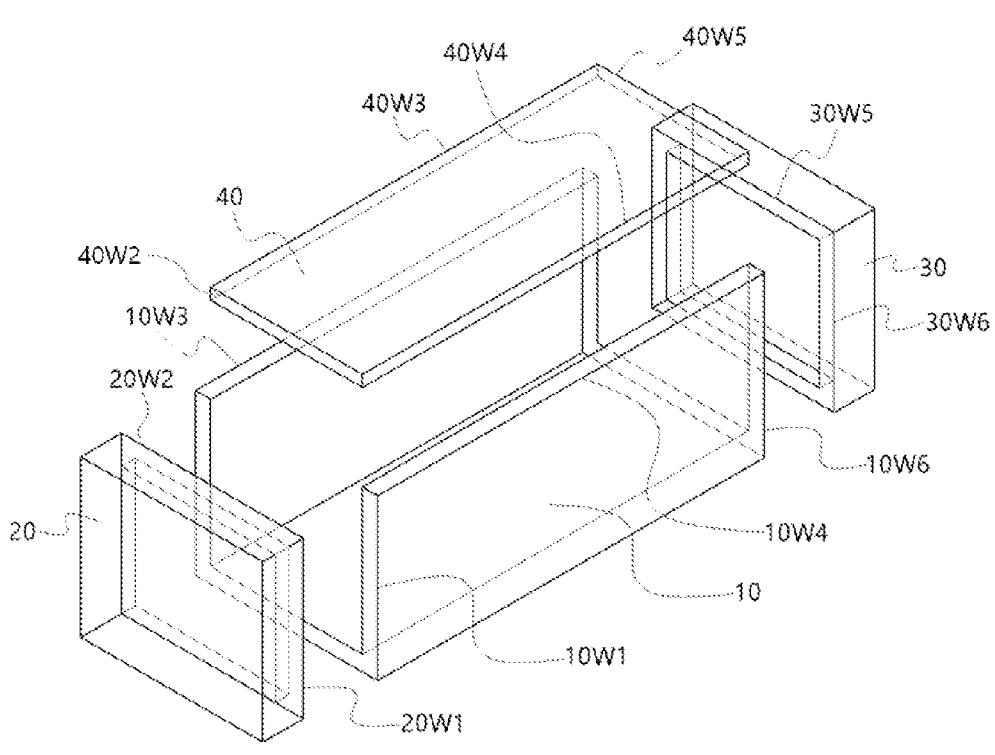
FIG. 4 is an exploded perspective view of housing members that are coupled by welding to form a housing in a battery module according to an exemplary embodiment of the present invention.

Substantially, as shown in FIG. 4, the housing may include a bent quadrangular plate-shaped first housing member 10 including a bottom surface and two left and right side surfaces integrally connected to the bottom surface; a quadrangular plate-shaped second housing member 40 coupled to (at least) the first housing member to form an upper surface facing the bottom surface; and quadrangular plate-shaped third housing member 20 and fourth housing member 30 coupled to the first housing member 10 and the second housing member 40 to form two front and rear side surfaces. The first base materials connected to each other by the welding joint portion may be one of the first to fourth housing members, and the second base material may be different from the first base material and may be another member of the first to fourth housing members.

A pair of the first base material and the second base material connected to each other by the aforementioned welding joint portion may be at least one selected from the following i) to v).

i) The first housing member 10-the second housing member 40 ii) The first housing member 10-the third housing member 20 iii) The first housing member 10-the fourth housing member 30 iv) The first housing member 10 welded to the third housing member 20 and the fourth housing member 30-the second housing member 40 v) The first housing member 10 welded to the second housing member 40 and the third housing member 20-the fourth housing member 30

In this case, a welded portion of the first housing member welded to the third and fourth housing members and/or a welded portion of the first housing member welded to the second and third housing members may have the shape of the welding joint portion described above, but a shape welded by the conventional general welding method is not excluded.

Based on the exploded perspective view of FIG. 4, referring to a pair of welding end portions welded to each other between each housing member, the welded portion of the first base material and the second base material may be one or more selected from a C-shaped end portion 10W1 of the first housing member 10 and lower and both side end portions 20W1 of the third housing member 20; an upper end portion 20W2 of the third housing member 20 and one end portion 40W2 of the second housing member 40; an end portion 40W3 of the second housing member 40 and a bent end portion 10W3 of the first housing member 10; the other end portion 40W4 of the second housing member 40 and the other bent end portion 10W4 of the first housing member 10; the other C-shaped end portion 10W6 of the first housing member 10 and lower and both side portions 30W6 of the fourth housing member 30; and the other end portion 40W5 of the second housing member 40 and an upper end portion 30W5 of the fourth housing member 30.

At this time, before the internal accommodating space is sealed by welding coupling between the first to fourth housing members, that is, in a state in which the upper portion or one front/rear side is opened, the battery cell may be loaded into the internal space formed by the housing member, and then, the open side may be closed. That is, before coupling of the second housing member 40, which is the upper plate, the third housing member 20 or the fourth housing member 30, a plurality of battery cells may be loaded into the internal accommodating space, and then, the housing member for closing the open one side may be welded and coupled.

A thickness of the housing member in the form of a quadrangular plate or a bent quadrangular plate may be in the order of $10^0$ mm to $10^1$ mm or may be at the level of 1 mm to 30 mm as a substantial example, but is not necessarily limited thereto.

Figure 5A:
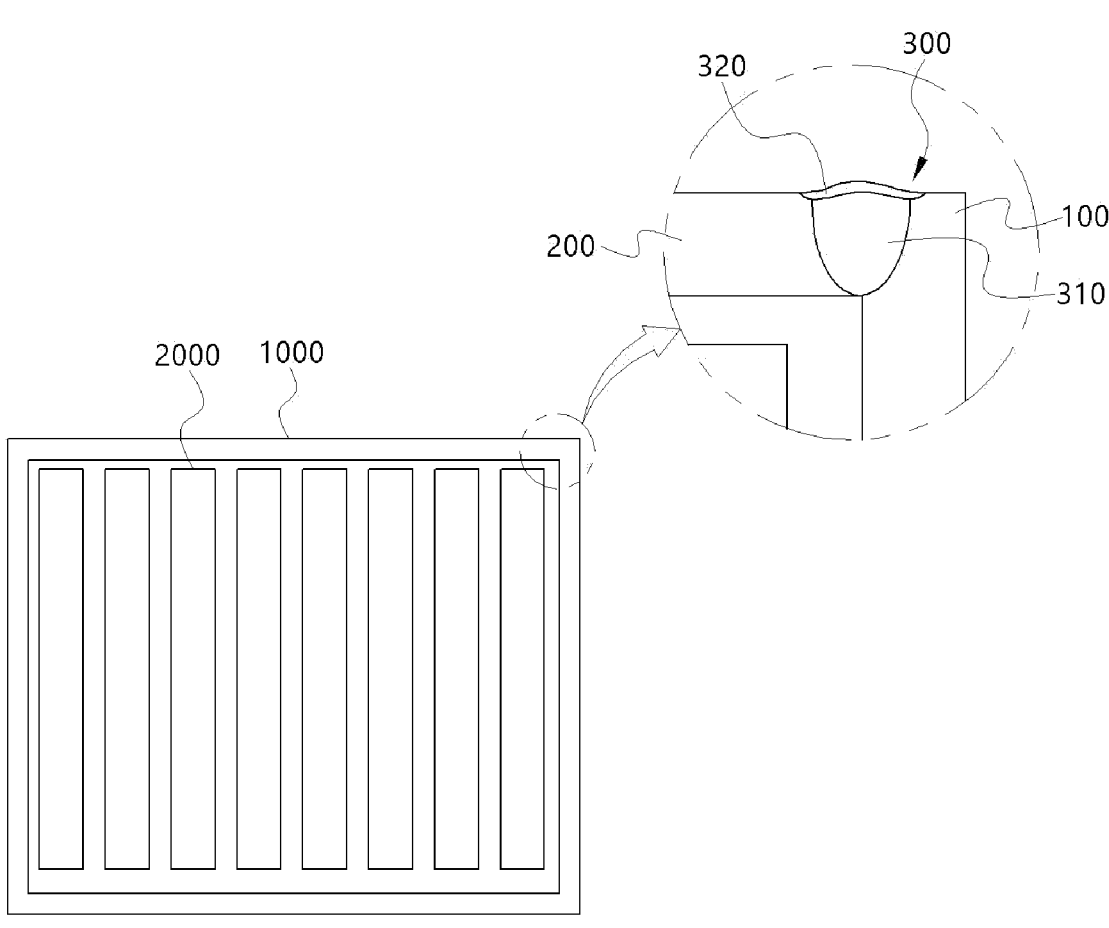
FIG. 5A is a cross-sectional view of a battery module including a housing having an internal accommodating space formed by welding coupling of housing members and a plurality of battery cells accommodated in the internal accommodating space of the housing according to an exemplary embodiment of the present invention.
Figure 5B:
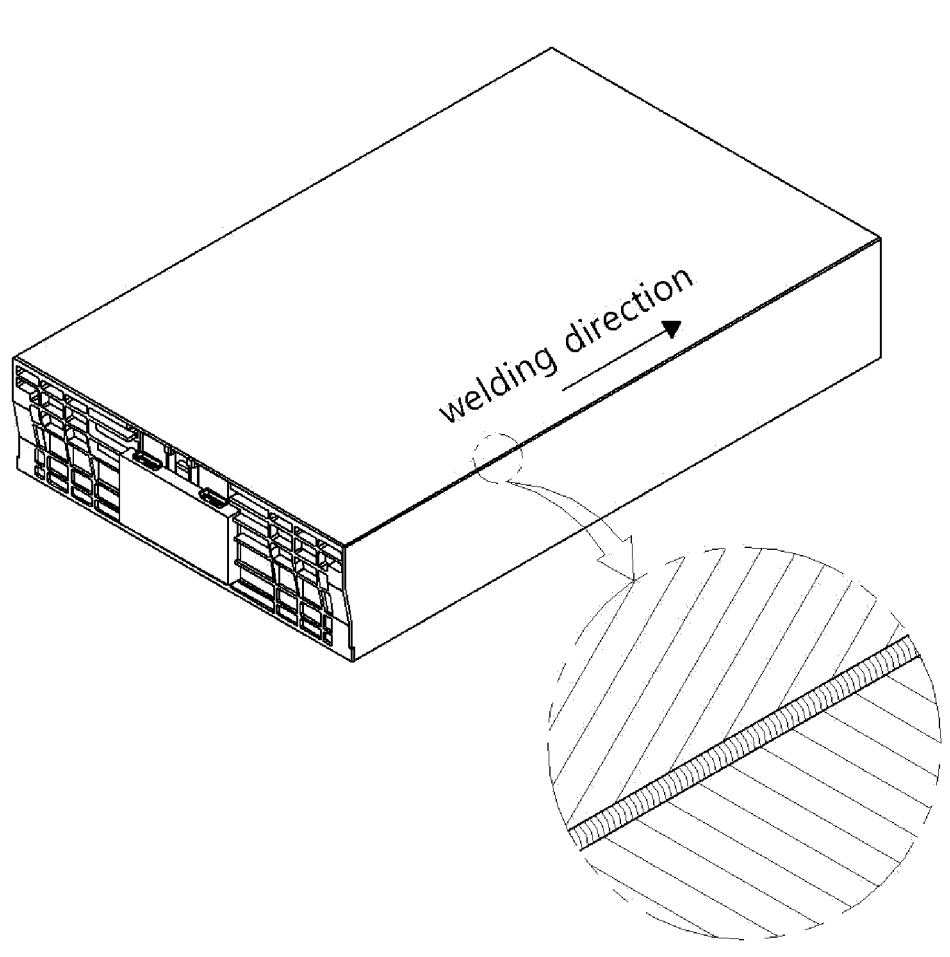
FIG. 5B is a perspective view of a battery module in which a welding direction (a welding progress direction or a laser travel direction indicated by the arrow in FIG. 5B) in a battery module according to an exemplary embodiment of the present invention.

FIG. 5A is a cross-sectional view of a battery module including a housing 1000 having an internal accommodating space formed by welding coupling of housing members and a plurality of battery cells 2000 accommodated in the internal accommodating space of the housing 1000 and FIG. 5B is a perspective view of a battery module showing a welding direction (a welding progress direction, a laser travel direction, indicated by the arrow in FIG. 5B). A region indicated by the dotted circle in FIG. 5A may correspond to a welded region (welding joint portion) between one end portion 40W4 of the second housing member 40 and the bent end portion 10W4 of the first housing member 10 in FIG. 4, and an enlarged view is shown in which the region shown by the dotted circle is enlarged on the right side. Although FIGS. 5A and 5B show an example in which a welding joint portion according to an exemplary embodiment of the present invention is formed at a specific portion in the coupling between the housing members constituting the battery housing, but this is only for better understanding of the disclosure and the welding joint portion according to an exemplary embodiment of the present invention may be formed in each of some or all of the couplings between the housing members constituting the battery housing. In addition, as welding continuously proceeds along the bonding surface between the two aligned members, thermal history of the surface region and the bonding region may be a thermal history at one position in a laser travel direction. As a substantial and experimental example, the thermal history of the surface region and the bonding region may be a thermal history based on a region corresponding to +0.5 Lref and −0.5 Lref in the welding progress direction based on a width (corresponding to Lref) of the welding joint portion at one position in the laser travel direction. In addition, the aforementioned minimum cross-section (reference plane) may correspond to a plane perpendicular to the welding progress direction.

In a specific embodiment, the welding joint portion 300 may be a butt joint, a corner joint, an edge joint, or a tee (T) joint, depending on a specific shape of the two base materials and a specific assembly structure between the housing members and the design shape of the housing, but is not necessarily limited thereto.

The present invention includes a method of manufacturing the battery module described above.

A method of manufacturing a battery module according to the present invention includes a) aligning a first base material and a second base material, which are welding objects and housing members that are combined with each other to form an internal accommodating space in which a plurality of battery cells are accommodated; and b) forming a welding joint portion including a bonding region and a surface region covering the bonding region by irradiating a contact surface between the first base material and the second base material with a laser, the bonding region and the surface region forming the welding joint portion having different microstructures due to different thermal history.

In operation a), the alignment of the first base material and the second base material may be an alignment for a butt joint, an alignment for a corner joint, an alignment for an edge joint, or a tee (T) joint, and may be an alignment in which all or a part of the housing shape designed by the alignment of the housing member(s), which are the first base material and the second base material, may be implemented. In addition, when the sealed housing is completed by forming the welding joint portion in operation b), an operation of loading a battery cell to a space corresponding to the internal accommodating space before welding may be further performed before operation a), after operation a), and before operation b).

The welding joint portion formed in operation b) is similar to or identical to the welding joint portion described above in the battery module. Accordingly, the method of manufacturing a battery module includes all the contents described above in the battery module.

In the battery module according to the present invention, the housing may have a different microstructure from that of the bonding region and may have improved mechanical properties by the surface region covering the bonding region.

As described above in the battery module, the bonding region and the surface region have different thermal histories, and the criterion of the thermal history may be based on the melting of a metal (alloy) and solidification of a melt.

Specifically, the bonding region and the surface region may have a different microstructure due to different thermal histories. The different thermal histories may mean the histories of melting and solidification of a metal belonging to the welding joint portion.

Specifically, in the thermal history of the surface region, Cs (Cs is a natural number greater than or equal to 2), which is the number of unit cycles, may be greater than Cj (Cj is a natural number greater than or equal to 1), which is the number of unit cycles, in the thermal history of the bonding region, and in a time scale, in the surface region, at least, the last unit cycle (Cs-th unit cycle) may be located after the last unit cycle (Cj-th unit cycle) in the bonding region.

In addition, based on the time scale, unit cycles performed first to Cj times in the surface region may be performed at the same or different time points as unit cycles performed first to Cj times in the bonding region, respectively, and may be performed at substantially the same time point.

In the thermal history, when the unit cycle of the surface region and the unit cycle of the bonding region are performed at the same time, it may mean that the regions (the entire regions) corresponding to the surface region and the bonding region are melted and solidified together by laser irradiation.

At least, that the last unit cycle in the surface region is performed after the thermal history of the bonding region is finished may mean that only the surface region is selectively melted and solidified by laser irradiation.

Figure 6:
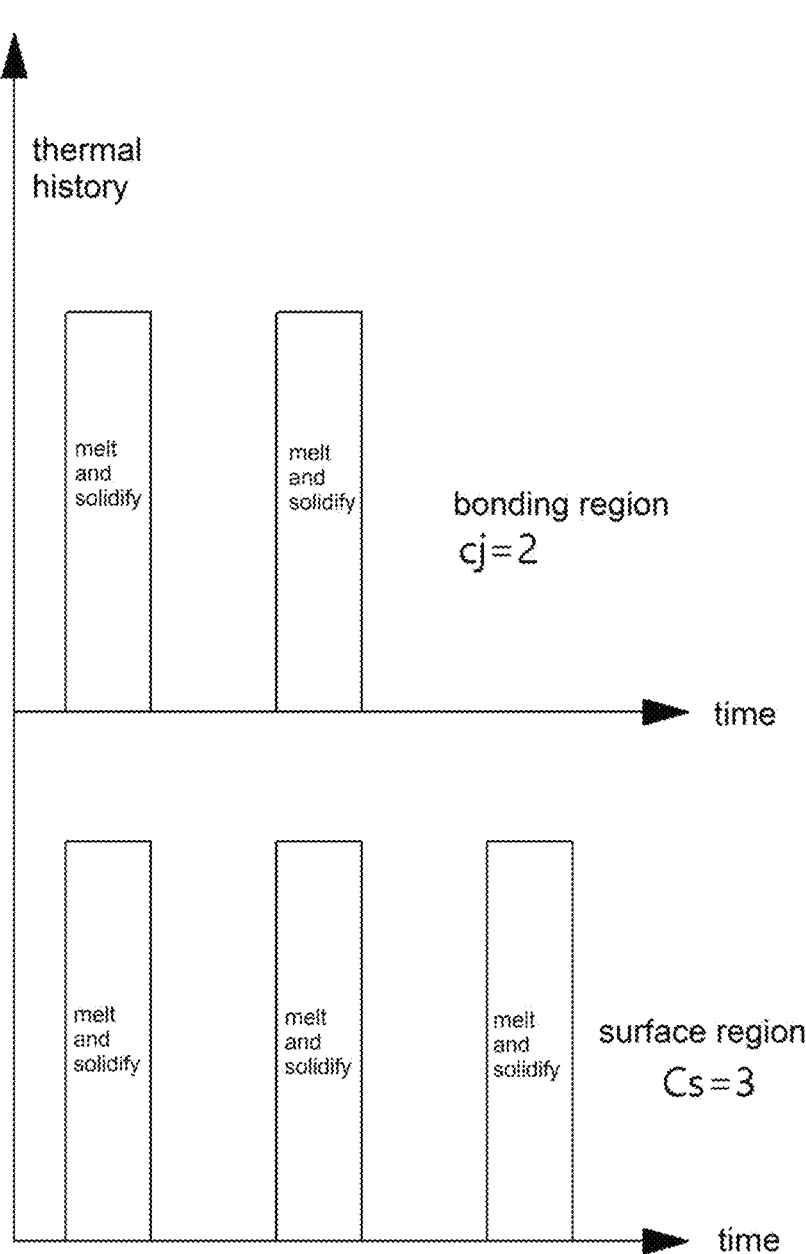
FIG. 6 is a view illustrating an example of thermal history according to time of each of a bonding region and a surface region in a method of manufacturing a battery module according to an exemplary embodiment of the present invention.

FIG. 6 is an example showing a thermal history in each of the surface region and the bonding region over time. In the example of FIG. 6, two unit cycles (Cj=2) are performed in the bonding region, three (Cs=3) unit cycles are performed in the surface region, and in each unit cycle corresponding to Cs<Cj, the unit cycle of the bonding region and the unit cycle of the surface region are performed at the same time.

Figure 7:
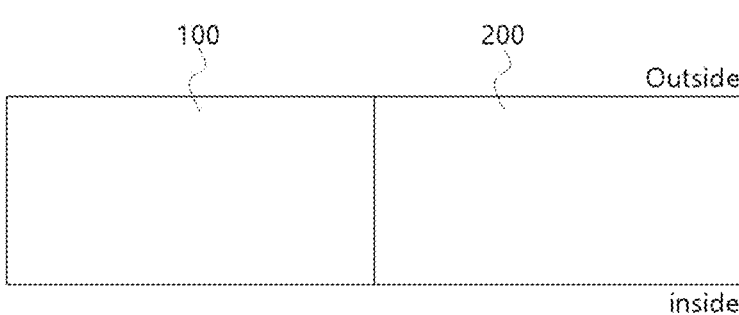
FIG. 7 is a process diagram illustrating each process of bonding between base materials, laser irradiation for welding, and laser irradiation for a surface treatment in a method of manufacturing a battery module according to an exemplary embodiment of the present invention.
Figure 7:
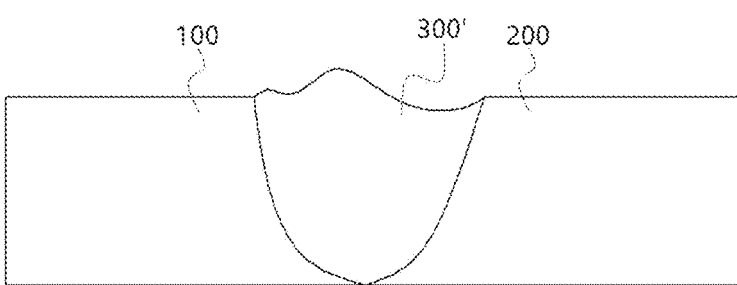
Figure 7:
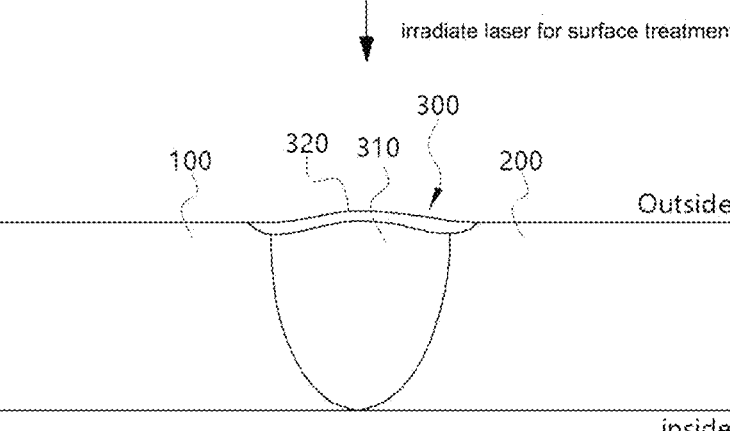

FIG. 7 is a view showing a process diagram of a method of manufacturing a battery module according to an exemplary embodiment, and as in the example shown in FIG. 7, and the method may include: a) aligning the first base material 100 and the second base material 200; and b) including b1) forming a welded bead 300' in which a first alloy of the first base material 100 and a second alloy of the second base material 200 are melted and solidified by irradiating a contact surface between the first base material 100 and the second base material 200 with a laser for welding; and b2) re-melting and solidifying a surface of a welded bead 300' by irradiating the welded bead 300 with a laser for surface treatment to form a welding joint portion 300 including a bonding region 310 which is not re-melted in the welded bead and a surface region 320 covering the bonding region and having a microstructure different from that of the bonding region due to the re-melting and solidification. As in the example shown in FIG. 7, unavoidable surface defects or high-level irregularities are inevitably formed on the welding bead 300' by strong energy applied to melting and bonding the two base materials 100 and 200. However, by the surface treatment of operation b2), the surface defects of the welding bead 300' are melted and removed, the surface irregularities are also alleviated, and a welding joint portion having a smooth surface and being substantially free from defects may be formed. Furthermore, even if some surface defects of the welding bead remain after the surface treatment, a size of the defects is remarkably reduced, substantially suppressing adverse effects on mechanical properties.

In this case, the welding bead of operation b1) may mean a region melted and solidified by laser irradiation at the time when the thermal history of the surface region is not yet finished and the thermal history of the bonding region is finished. That is, the welding bead of operation b1) may refer to a region including both the bonding region in which all unit cycles up to the last (Cj times) have been performed and the surface region at a time point when the last unit cycle in the thermal history of the bonding region is performed in the thermal history of the surface region having the unit cycle of Cs times.

Substantially, as the welding joint portion (bonding region and surface region) is formed by irradiating a laser from the outside of the housing, the base materials may be melted from the surface to a predetermined depth based on a contact surface. Accordingly, from first to Cj-th, the unit cycle of the surface region and the unit cycle of the bonding region may be performed at the same time point. When performing unit cycles from first to Cj-th simultaneously, a single laser or two or more lasers may be irradiated in one unit cycle. That is, when irradiating the laser for welding, a single laser may be irradiated or two or more lasers may be irradiated. Even if there is a time difference at the time of laser irradiation when two or more lasers are irradiated, when the other laser is irradiated before the melt is entirely solidified by at least one laser, only a molten shape of the base material may be changed, and thus, this case belongs to one unit cycle. That is, as described above, the unit cycle is based on the melting and solidification of the melt, and thus, a melt formed by different lasers irradiated with a certain time difference or formed by different lasers irradiated at the same time is one melt, so that when a melt formed to be included in a melting process of one unit cycle is substantially entirely solidified, one unit cycle may be considered to have been performed.

Accordingly, after the melt melted by the laser for welding irradiation of operation b1) is substantially solidified into a solid, a laser for surface treatment may be irradiated. Whether the melt is solidified by the laser for welding or the degree of solidification may affect a cooling rate of a thin melt layer melted by the irradiation of the laser for surface treatment. Not only the energy of the laser for surface treatment is lower than that of the laser for welding, but also the laser for surface treatment is irradiated after the melt melted by the irradiation of the laser for welding in b1) is solidified into a solid, so that heat of the molten thin surface melt layer is rapidly conducted toward the outside of the housing and the inside of the housing and may be cooled quickly. Such rapid cooling is very advantageous for structure refinement of the surface region.

From a positional point of view, a unit cycle of melting and solidification of thermal history may be based on when a position belonging to a contact surface between at least the first base material and the second base material is melted and solidified.

In a specific embodiment, Cj, the number of unit cycles in the thermal history of the bonding region may be 1 to 3, more substantially 1 to 2, even more substantially 1, and Cs may be greater than or equal to Cj+1. When Cs is Cj+1, a single-layered surface region may be formed, and when Cs is a natural number equal to or greater than Cj+2, a multi-layer surface region may be formed. The number of layers stacked in the surface region of the multi-layer may correspond to Cs-Cj, and Cs-Cj may be a natural number of 2 to 10, specifically, a natural number of 2 to 5, more specifically, a natural number of 2 to 3.

In the thermal history of the surface region, in unit cycles performed in excess of the Cj-th unit cycle among the total Cs unit cycles, the laser energy irradiated in a subsequent unit cycle may be lower than laser energy of a unit cycle performed immediately before. That is, in the thermal history of the surface region, the unit cycles performed in excess of the Cj-th unit cycle among the total Cs unit cycles may be irradiated with a laser for surface treatment so that a thinner region is re-melted and solidified as the unit cycle progresses. Accordingly, in a case in which the surface region has a multi-layer structure, a layer closer to the bonding region is a layer formed by a preceding unit cycle, a layer closer to the surface is a layer formed by a subsequent unit cycle, and a layer including the surface may be a layer formed by the last unit cycle. When the surface region has a multi-layer structure, the stacked layers constituting the surface region may have a finer microstructure from the bonding region side to the surface side direction.

From a view point of irradiation of the laser for surface treatment, not the thermal history, in operation b2), the laser for surface treatment may be irradiated n times (n is a natural number greater than or equal to 2, specifically 2 to 10), and j-th (j is a natural number of 2 to n) laser for surface treatment may be irradiated for re-melting and solidification to be thinner than a depth of the re-melted and solidified region by irradiation of the (j−1)-th irradiated laser for surface treatment. Thereby, a surface layer having a multi-layer structure of n layers may be formed.

Advantageously, in operation b2), when a penetration depth of the welding joint portion is D, the laser for surface treatment may be irradiated so that a thickness of the surface region satisfies 0.05 D to 0.30 D. In detail, in the thermal history having a unit cycle of Cs when forming a surface region of a single-layer structure or a multi-layer structure, when a laser is irradiated for the unit cycle performed (Cj+1)-th, the laser for surface treatment may be irradiated so that a depth melted from the surface of the welding joint portion (or welding bead) when a penetration depth of the welding joint portion (or welding bead) is D satisfies 0.05 D to 0.30 D.

In addition, in operation b2), a laser for surface treatment may be irradiated so that the surface of the welding bead in operation b1) is entirely re-melted. At this time, a laser for surface treatment may also be irradiated so that the surface of the adjacent base material (the first base material and/or the second base material) in contact with the welding bead is also further melted. Accordingly, the surface region may be formed in a form that completely covers the bonding region.

As described above, by forming the surface region by the difference in thermal history, specifically, operation b2), surface defects occurring during welding may be resolved and the welding joint portion may be protected from an impurity-induced degradation by controlling an impurity distribution.

In a specific example, the laser for welding and the laser for surface treatment may each be a near-infrared laser. The welding bead in operation b1) may be formed by keyhole welding, heat conduction welding, or keyhole welding and heat conduction welding, and the surface region in operation b2) may be formed by heat conduction welding. Even when the welding bead is formed by keyhole welding, it is re-melted and solidified on the surface of the welding bead in operation b2), and surface defects caused by keyhole welding may be resolved. Accordingly, while maintaining the advantages of keyhole welding, such as strong bonding between base materials and rapid welding, defects caused by keyhole welding may be resolved, and furthermore, it may be protected from deterioration due to impurities.

A difference in microstructure between the surface region and the bonding region, a difference in impurity distribution, a material of the first base material (first alloy) and a material of the second base material (second alloy), a specific shape of the first base material and the second base material, a coupling relationship, etc. are similar to or the same as those described above in the battery module.

Figure 8:
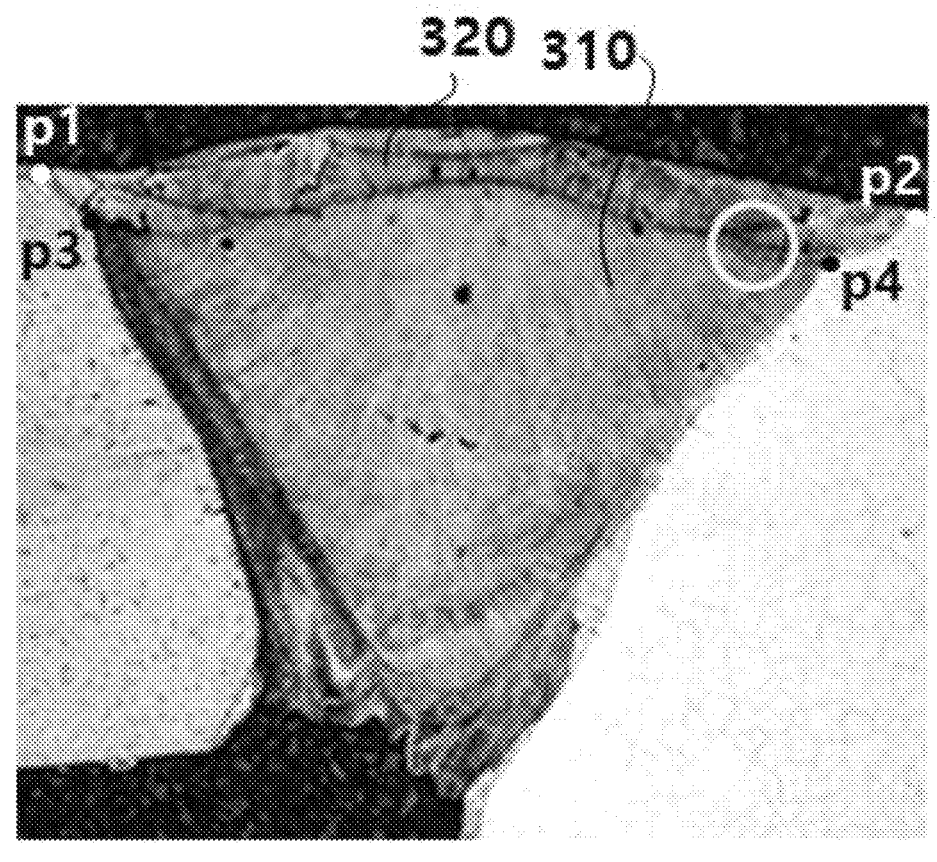
FIG. 8 is an optical micrograph (upper) and a scanning electron micrograph (lower) in which a cross-section of a welding joint portion is observed in a battery module according to an exemplary embodiment of the present invention.
Figure 8:
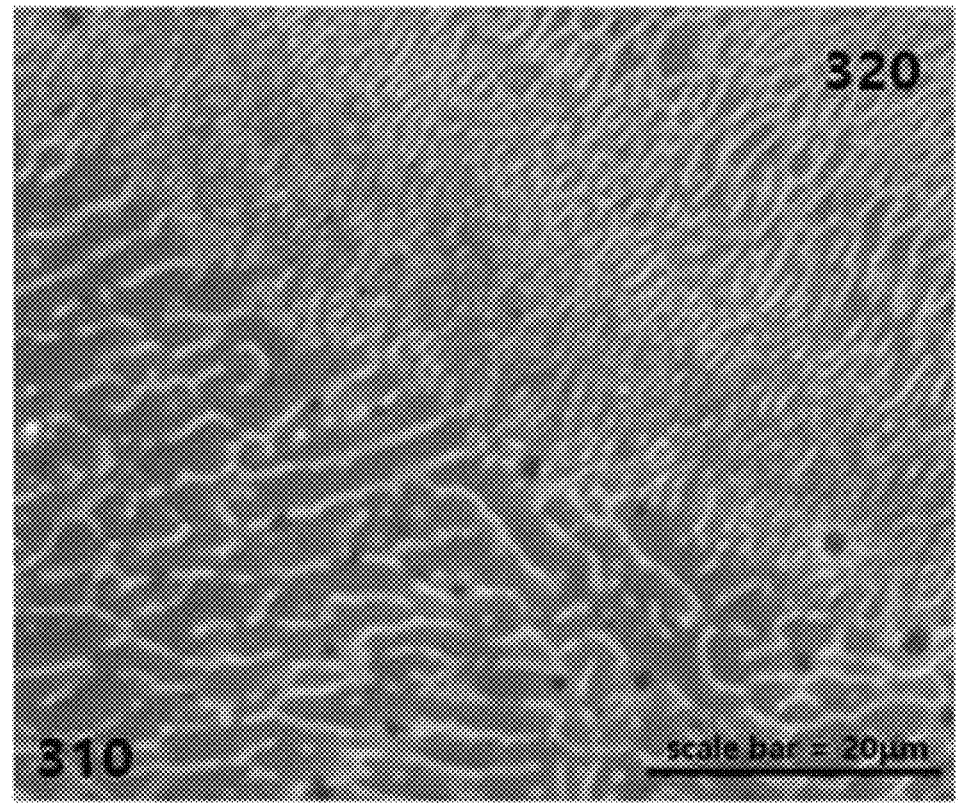

FIG. 8 is an optical photograph (upper drawing) observing the shortest cross-section (reference plane) of the welding joint portion manufactured according to an exemplary embodiment, and a scanning electron microscope observation photograph (lower drawing) observing a boundary between a bonding region and a surface region indicated by the white circle in the optical photograph. The example of FIG. 8 is an example in which Al 5000 series and ALDC having a silicon content of 9 wt % or more are used as housing members (the first base material and the second base material) to be welded. In detail, after the two housing members are butt-coupled, a welding bead is formed by irradiating an infrared laser (laser for welding) according to the conventional laser welding method between the housing members, and then a welding joint portion is formed by irradiating an infrared laser (laser for surface treatment) so that a surface region of the welding bead to a depth of 0.12 from the surface (0) of the welding bead based on a penetration depth of the welding bead as 1 is re-melted and a portion of the base material adjacent to the surface of the welding bead is melted.

As shown in the scanning observation micrograph of FIG. 8, a lamellar structure was observed in both the bonding region and the surface region, and a lamellar spacing of the surface region was significantly smaller than that of the bonding region, indicating that the microstructure of the surface region was significantly finer than that of the bonding region. Also, a boundary between the surface region and the bonding region is clearly observed even under an optical microscope due to a difference in microstructure between the surface region and the bonding region, as can be seen from the optical microscope observation photograph.

Referring to the overall shape of the welding joint portion, it can be seen that the surface region covers the bonding region, and referring to the boundary line between the surface region and the bonding region, it can be seen that there is a convex region convexly protruding to the outside of the housing in the vicinity of the center of the welding joint portion. In addition, the penetration depth D, which is the length of the perpendicular between the reference line (a straight line connecting p1 and p2) and the lowest point (the lowest point to the inner side) of the welding joint portion, was about 1.02 T (T is a thickness of a thinner member among the two members to be welded), a thickness of the surface region was about 0.1 D at the position at the center of the reference line, and a length of the straight line connecting p3 and p4 was about 850 of the length of the reference line.

Figure 9:
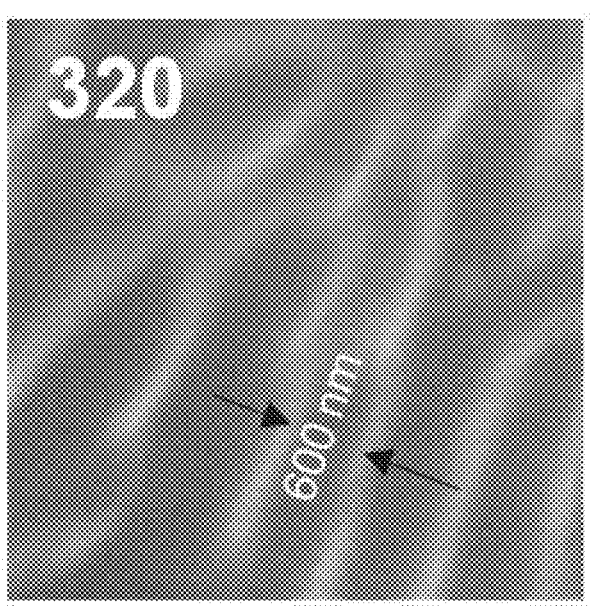
FIG. 9 is a scanning electron microscope photograph of a bonding region and a surface region observed at high magnification in a cross-section of the welding joint portion of FIG. 8.
Figure 9:
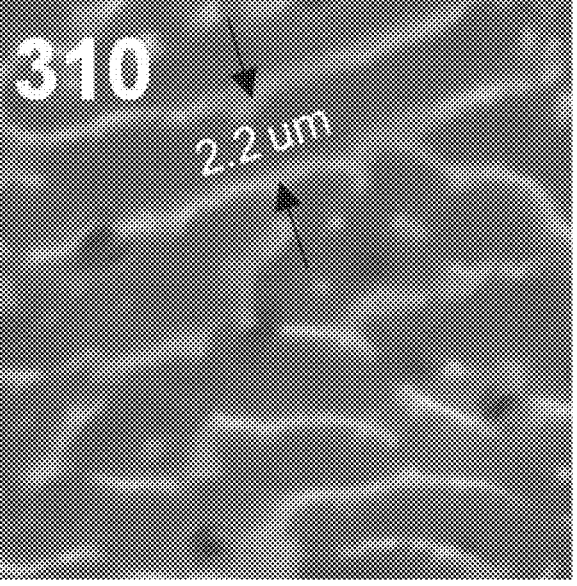

FIG. 9 is a scanning electron microscope photograph of the bonding region and the surface region observed at a higher magnification in the welding joint portion of FIG. 8. As in the example shown in FIG. 9, an average lamellar spacing of the surface region was about 600 nm, an average lamellar spacing of the bonding region was about 2.2 μm.

Figure 10:
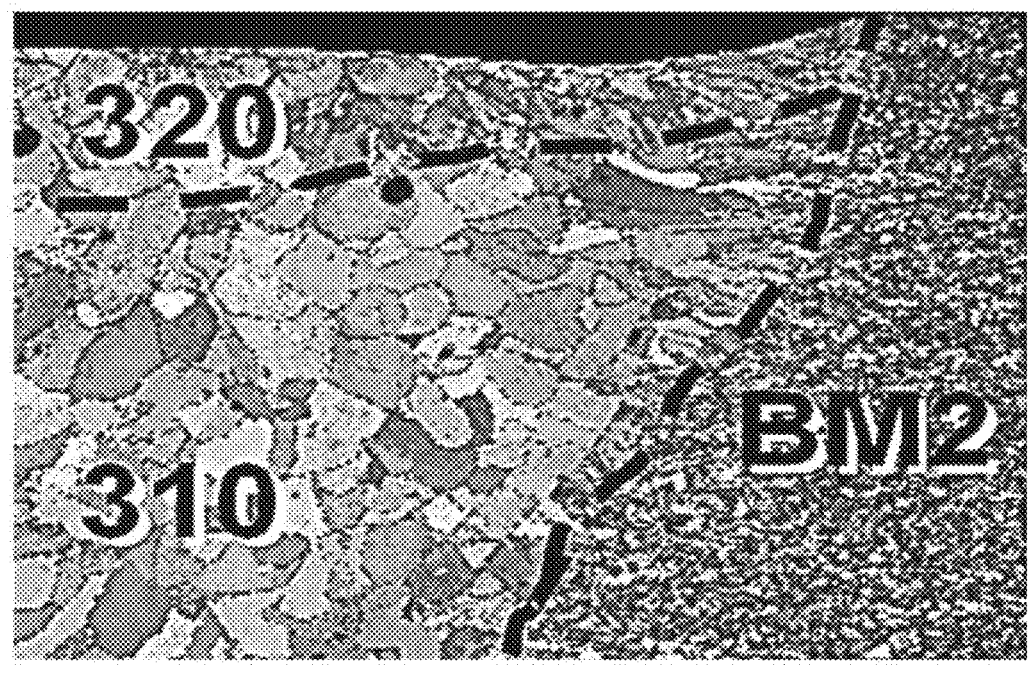
FIG. 10 is a picture of the EBSD tissue of a cross-section of a welding joint portion in a battery module according to an exemplary embodiment of the present invention.

FIG. 10 is an example in which two base materials are aluminum-based alloys, but both base materials do not have a high silicon content, so a welding joint portion of a normal structure (metal structure shown by normal grain growth) in which a matrix is formed in a single phase is formed, showing an EBSD structure diagram of the welding joint portion (minimum cross-section). In the example of FIG. 10, the welding joint portion is irradiated with an infrared laser to be re-melted to a depth of 0.2 from the surface of the welding bead based on a penetration depth of the welding bead of 1 when irradiating the laser for surface treatment, but the base material(s) adjacent to the welding bead is not melted by the irradiation of the laser for surface treatment.

As can be seen from the photograph of the EBSD structure of FIG. 10, even when both the surface region and the bonding region of the welding joint portion have normal structures, it can be seen that the surface region has a finer structure compared to the bonding region. An average grain diameter of the surface region was 50 μm, and an average grain diameter of the bonding region was 90 μm.

In addition, results of examining surface defects, such as holes per unit length along the welding progress direction in each of the sample of FIG. 8 and the sample of FIG. 10 confirmed that substantially all of the welding defects formed by the previous welding were resolved by the surface treatment, so that the welding joint portion was substantially free from welding surface defects.

In the battery module according to an exemplary embodiment of the present invention, a welding joint portion of a housing includes a bonding region in which base materials are melted and bonded and a surface region covering the bonding region, and the bonding region and the surface region have different microstructures, thus having improved mechanical physical properties.

In addition, in the battery module according to an exemplary embodiment of the present invention, defects occurring due to high energy applied to a welding portion to cause melting bonding between the base materials may be resolved by the surface region formed by the application of lower energy, and thus, the welding joint portion may be substantially free from surface defects and the module appearance may have improved quality.

In addition, in the battery module according to an exemplary embodiment of the present invention, because a concentration of impurities that are grain boundary segregated due to different thermal histories between the bonding region and the surface region is low, the welding joint portion may be free from the risk of impurity-induced defects (degradation), such as hydrogen embrittlement or hot cracking.

In the method of manufacturing a battery module according to an exemplary embodiment of the present invention, as the surface defects caused by welding are resolved by the irradiation of a laser for surface treatment, welding between the base materials is strongly performed without substantially considering the degree of surface defect formation, and welding may be performed under the condition that welding is performed more quickly.

In addition, in the method of manufacturing a battery module according to an exemplary embodiment of the present invention, the welding joint portion may be substantially free from surface defects, deterioration of physical properties caused by impurities may also be suppressed to improve mechanical properties, and the surface of the welding joint portion is smooth without irregularities, improving aesthetics of a module appearance.

As described above, the present invention has been described with specific matters and limited exemplary embodiments and drawings, but these are only provided to help a more general understanding of the present invention, and the present invention is not limited to the above exemplary embodiments, and is not limited to the present invention. Various modifications and variations are possible from these descriptions by those of ordinary skill in the art.

Therefore, the present invention should not be limited to the described exemplary embodiments, and not only the claims to be described later, but also all those with equivalent or equivalent modifications to the claims will be said to fall within the scope of the present invention.

What is claimed is:

1. A battery module comprising:
a housing having an internal accommodating space; and
a plurality of battery cells located in the internal accommodating space,
wherein
the housing includes a welding joint portion in which a first base material of a first alloy and a second base material of a second alloy are welded,
the welding joint portion includes a bonding region in which the first base material and the second base material are melt-bonded and a surface region covering the bonding region,
the bonding region and the surface region have different microstructures and
wherein the bonding region and the surface region have different microstructures due to different thermal histories.

2. The battery module of claim 1, wherein,
the surface region has a finer microstructure compared to the bonding region.

3. The battery module of claim 2, wherein,
the surface region has a smaller average grain size or lamellar spacing compared to the bonding region.

4. The battery module of claim 1, wherein the bonding region and the surface region have different distributions of impurities due to a difference in the microstructure.

5. The battery module of claim 1, wherein, based on a minimum cross-section traversing the welding joint portion from the first base material side to the second base material side, as a reference plane, a boundary line between the bonding region and the surface region in the reference plane includes a convex region convex to the outside of the housing.

6. The battery module of claim 1, wherein the surface region has a single-layer structure or a multi-layer structure in which two or more layers are stacked.

7. The battery module of claim 1, wherein, when a penetration depth of the welding joint portion is D, a thickness of the surface region is in the range of 0.05 D to 0.30 D.

8. The battery module of claim 1, wherein the microstructure is a lamellar structure.

9. The battery module of claim 8, wherein, when a lamellar spacing of the bonding region is tw, a lamellar spacing ts of the surface region is in the range of 0.05 tw to 0.70 tw.

10. The battery module of claim 8, wherein the first alloy and the second alloy are each an aluminum alloy.

11. The battery module of claim 10, wherein at least one of the first alloy and the second alloy is an aluminum-based alloy including silicon.

12. The battery module of claim 1, wherein the welding joint portion is a butt joint, a corner joint, an edge joint, or a T joint (tee joint).

13. The battery module of claim 1, wherein the first base material and the second base material each have a shape of a quadrangular plate or a bent quadrangular plate in which one or both end portions are vertically bent.

14. The battery module of claim 1, wherein the housing comprises:

a bent quadrangular plate-shaped first housing member including a bottom surface and two left and right side surfaces integrally connected to the bottom surface;

a quadrangular plate-shaped second housing member coupled to the first housing member to form an upper surface facing the bottom surface; and quadrangular plate-shaped third housing member and fourth housing member coupled to the first housing member and the second housing member to form two front and rear side surfaces, wherein the first base materials connected to each other by the welding joint portion is one of the first to fourth housing members, and the second base material is different from the first base material and is another member of the first to fourth housing members.

* * * * *